US 7,550,517 B2

United States Patent
Stanjek et al.

(10) Patent No.: US 7,550,517 B2
(45) Date of Patent: Jun. 23, 2009

(54) EXPANDABLE MIXTURES THAT ARE DEVOID OF ISOCYANATES

(75) Inventors: Volker Stanjek, München (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 411 days.

(21) Appl. No.: 10/549,894

(22) PCT Filed: Mar. 4, 2004

(86) PCT No.: PCT/EP2004/002214

§ 371 (c)(1), (2), (4) Date: Sep. 16, 2005

(87) PCT Pub. No.: WO2004/083271

PCT Pub. Date: Sep. 30, 2004

(65) Prior Publication Data

US 2006/0189705 A1    Aug. 24, 2006

(30) Foreign Application Priority Data

Mar. 17, 2003    (DE)    ............... 103 11 723

(51) Int. Cl.
*C08J 9/14*    (2006.01)
*C08G 18/10*    (2006.01)

(52) U.S. Cl. .................. 521/124; 521/155; 521/159; 521/170; 106/287.11; 106/287.13

(58) Field of Classification Search .................. 521/124, 521/155, 159, 170; 106/287.11, 287.13
See application file for complete search history.

(56) References Cited

U.S. PATENT DOCUMENTS

| | | | |
|---|---|---|---|
| 5,880,167 | A | 3/1999 | Krebs et al. |
| 6,020,389 | A | 2/2000 | Hoheneder |
| 2004/0072921 | A1 | 4/2004 | Stanjek et al. |

FOREIGN PATENT DOCUMENTS

| | | |
|---|---|---|
| DE | 43 03 848 A1 | 8/1994 |
| EP | 0 931 800 A1 | 7/1999 |
| WO | WO 96/06124 | 2/1996 |
| WO | WO 00/04069 | 1/2000 |
| WO | WO 02/066532 A1 | 8/2002 |
| WO | WO 02/068491 A1 | 9/2002 |

OTHER PUBLICATIONS

Derwent Abstract corres. to WO 02068491 [AN2002-056633].
Derwent Abstract corres. to WO 0004069 [AN2000-225102].
Derwent Abstract corres. to DE 4303848 [AN 1994-250202].

*Primary Examiner*—Irina S Zemel
(74) *Attorney, Agent, or Firm*—Brooks Kushman P.C.

(57) ABSTRACT

Foamable mixtures of excellent quality and which are isocyanate free are prepared from silane-terminated prepolymers in which a proportion of the silane end groups are replaced by non-polar organic groups. As a result, the prepolymers have much greater hydrocarbon blowing agent compatibility.

12 Claims, 1 Drawing Sheet

EXPANDABLE MIXTURES THAT ARE DEVOID OF ISOCYANATES

CROSS-REFERENCE TO RELATED APPLICATION

This application claims priority to PCT Appln. No. PCT/EP2004/002214 filed Mar. 4, 2004, and to German application 10 311 723.7 filed Mar. 17, 2003.

BACKGROUND OF THE INVENTION

1. Field of the Invention

The invention relates to isocyanate-free foamable mixtures comprising prepolymers and a hydrocarbon blowing agent.

2. Description of the Related Art

Sprayable in-situ foams are employed for filling hollow spaces, in particular in the building sector. Here, they are used, inter alia, for sealing joins, e.g. around windows and doors, and act as excellent insulating materials so as to give good thermal insulation. Further applications are, for example, insulation of pipes or filling hollow spaces in industrial appliances with foam.

All conventional in-situ foams are polyurethane foams (PU foams) which in the uncrosslinked state comprise prepolymers which have a high concentration of free isocyanate groups. These isocyanate groups are able to undergo addition reactions with suitable reaction partners even at room temperature, as a result of which curing of the spray foam is achieved after application. The foam structure is produced by incorporating a volatile blowing agent into the as yet uncrosslinked raw material and/or by means of carbon dioxide formed by reaction of isocyanates with water. The foam is generally ejected from pressure cans by means of the autogenous pressure of the blowing agent.

Reaction partners employed for the isocyanates are alcohols having two or more OH groups, especially branched and unbranched polyols, or else water. The latter reacts with isocyanates to liberate carbon dioxide, as mentioned above, and form primary amines which can then add directly onto a further, as yet unconsumed isocyanate group. This results in formation of urethane and urea units which, owing to their high polarity and their ability to form hydrogen bonds in the cured material, can form partially crystalline substructures and thus lead to foams having a high hardness, pressure resistance and ultimate tensile strength.

Blowing agents used are mostly gases which are condensable at a relatively low pressure and can thus be mixed in the liquid state into the prepolymer mixture without the spray cans having to be subjected to excessively high pressures. In addition, the prepolymer mixtures contain further additives such as foam stabilizers, emulsifiers, flame retardants, plasticizers and catalysts. The latter are usually organic tin(IV) compounds or tertiary amines. However, iron(III) complexes, for example, are also suitable here.

PU spray foams are produced both as one-component (1K) foams and as two-component (2K) foams. The 1K foams cure exclusively through contact of the isocyanate-containing prepolymer mixture with atmospheric moisture. Foam formation can additionally be aided by the carbon dioxide liberated during the curing reaction of 1K foams. 2K foams comprise an isocyanate component and a polyol component which have to be mixed well with one another immediately before foaming and cure as a result of the reaction of the polyol with the isocyanates. An advantage of the 2K systems is an extremely short curing time of sometimes only a few minutes to achieve complete curing. However, they have the disadvantage that they require a complicated pressure can having two chambers and, in addition, are significantly less comfortable to handle than the 1K systems.

The cured PU foams display, in particular, excellent mechanical and thermal insulation properties. Furthermore, they have very good adhesion to most substrates and are stable virtually indefinitely under dry and UV-protected conditions. Further advantages are the toxicological acceptability of the cured foams from the point in time at which all isocyanate units have reacted quantitatively, and their swift curing and their easy handleability. Due to these properties, PU foams have been found to be very useful in industrial practice.

However, PU spray foams have the critical disadvantage that the isocyanate groups can, owing to their high reactivity, also develop a serious irritant action and toxic effects. In addition, the amines which can be formed by reaction of monomeric diisocyanates with an excess of water are in many cases suspected of being carcinogenic. Such monomeric diisocyanates are likewise present in addition to the isocyanate-terminated prepolymers in most spray foam mixtures. The uncrosslinked spray foam compositions are thus toxicologically unacceptable until they are completely cured. Critical factors here are not only direct contact of the prepolymer mixture with the skin but also, in particular, possible aerosol formation during application of the foam or vaporization of low molecular weight constituents, e.g. monomeric isocyanates. This results in the risk of toxico logically unacceptable compounds being taken up via inhaled air. In addition, isocyanates have a considerable allergenic potential and can, inter alia, trigger asthma attacks. These risks are increased by the factor that the PU spray foams are often not used by trained and practiced users but by handymen and home workers, so that correct handling cannot always be assumed.

The hazard potential exhibited by conventional PU foams and the associated compulsory labeling has additionally resulted in the problem of considerably decreasing acceptance of the corresponding products by users. In addition, completely or partly emptied spray cans are classified as hazardous waste and have to be labeled accordingly and in some countries, e.g. Germany, even have to be made available for reuse by means of a costly recycling system.

In order to overcome these disadvantages, DE-A-43 03 848, inter alia, has prescribed prepolymers for spray foams which contain no monomeric isocyanates or contain only low concentrations of these. However, a disadvantage of such systems is the fact that the prepolymers always still have isocyanate groups, so that such PU spray foams may well be better than conventional foams from a toxicological point of view but cannot be described as nonhazardous. In addition, the acceptance and waste problems are not solved by such foam systems.

It would therefore be desirable to have prepolymers which do not crosslink via isocyanate groups and are thus toxicologically acceptable available for the production of spray foams. Moreover, these prepolymer mixtures should make it possible to produce spray foams which in the cured state have similarly good properties and, in particular, a comparable hardness compared to conventional isocyanate-containing PU foams. In addition, one-component spray foam systems which cure exclusively through contact with atmospheric moisture also have to be possible. These should display comparably problem-free handling and processibility including a high curing rate even at a low catalyst concentration. The latter is important particularly since the organotin compounds generally used as catalysts are likewise problematical from a toxicological point of view. In addition, tin catalysts often also contain traces of highly toxic tributyltin derivatives. It would therefore be particularly advantageous to have a prepolymer system which has such favorable curing properties that a tin catalyst can be entirely dispensed with.

On this subject, the literature, e.g. U.S. Pat. No. 6,020,389, describes condensation-crosslinking silicone foams which comprise alkoxy-, acyloxy- or oximo-terminated silicone prepolymers. Such foamable mixtures are in principle suitable for producing 1K foams which cure at room temperature only through atmospheric moisture. However, such systems comprising purely silicone-containing prepolymers can be used only for producing elastic flexible to semi-rigid foams. They are not suitable for producing rigid, nonbrittle in-situ foams.

WO 00/04069 and WO 02/068419 describe prepolymer mixtures comprising alkoxysilane-terminated prepolymers for producing rigid spray foams. These are polymers having an organic backbone which generally has a conventional polyurethane structure. This can be formed by reaction of customary diisocyanates with polyols. If an appropriate excess of diisocyanates is used in this first reaction step, isocyanate-terminated prepolymers are obtained. These can then be reacted with aminopropyltrimethoxysilane derivatives in a second reaction step to form the desired alkoxysilane-terminated polyurethane prepolymers. In WO 02/068419, a specific reactive diluent is additionally added to this silane-terminated prepolymer. The prepolymers and any reactive diluents present can condense with one another in the presence of a suitable catalyst and of water with elimination of methanol and as a result cure. The water can be added as such or can originate from contact with atmospheric moisture. Both 1K and 2K foams can thus be produced using such a system.

However, the alkoxysilane-terminated polyurethane prepolymers described in WO 00/04069 and WO 02/068491 have, inter alia, the disadvantage of a relatively low reactivity toward atmospheric moisture. For this reason, high concentrations of a tin catalyst are necessary to achieve sufficiently rapid curing.

A significant improvement is provided by a system described in WO 02/066532. The alkoxysilane-terminated prepolymers described here for producing isocyanate-free spray foams comprise silane end groups of the general formula [1],

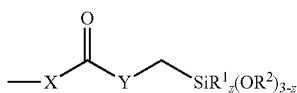

[1]

where:
X and Y are each an oxygen atom, an N—$R^3$ group or a sulfur atom,
$R^1$ is an alkyl, cycloalkyl, alkenyl or aryl radical having 1-10 carbon atoms,
$R^2$ is an alkyl radical having 1-2 carbon atoms or an ω-oxaalkylalkyl radical having a total of 2-10 carbon atoms,
$R^3$ is a hydrogen atom, an alkyl, alkenyl or aryl radical having 1-10 carbon atoms or a —$CH_2$—$SiR^1_z(OR^2)_{3-z}$ group and z is 0 or 1, with the proviso that at least one of the two groups X and Y is an NH function.

In these alkoxysilyl-terminated prepolymers, the crosslinkable alkoxysilyl groups are separated from a urethane or urea unit by only a methyl spacer. These prepolymers are astonishingly reactive toward water and thus have extremely short tack-free times in the presence of atmospheric moisture and can even be crosslinked in the absence of tin.

A further critical disadvantage of silane-terminated prepolymers for spray foam applications could, on the other hand, be overcome neither in WO 00/04069 or WO 02/068491 nor in WO 02/066532. All silane-terminated prepolymers specifically described therein are largely incompatible with blowing agent mixtures consisting exclusively of or containing large proportions of hydrocarbons, e.g. propane/butane mixtures. Although emulsions which are stable for a number of hours and can also be foamed without problems can be prepared from the prepolymers and these blowing agents, these emulsions display substantial demixing on standing for a number of days or weeks. However, such long times left standing occur regularly in the practicable use of spray foam cans. Owing to the high viscosity of the silane-terminated prepolymers, reemulsification after demixing can only be achieved by extremely vigorous and long shaking. In general, the prepolymer is so highly viscous that reemulsification of the prepolymer/blowing agent mixture at room temperature is no longer possible at all, and the emulsion additionally has to be heated to >40° C. before shaking. However, such complicated procedures prior to processing of spray foams would no longer be acceptable to the users of spray foams.

Although the prepolymers described in WO 00/04069, WO 02/068491 or WO 02/066532 display sufficient compatibility with other blowing agents, these blowing agents each have other critical disadvantages. Thus, dimethyl ether displays a considerable destabilizing action on the as yet uncured foam. Dimethyl ether contents of >20% in the blowing agent mixture are therefore problematical or, in most cases, even completely impossible. On the other hand, fluorine-containing blowing gases are regarded as critical because of their action as greenhouse gases and are already prohibited for spray foam applications in some countries, e.g. Denmark.

In particular, however, all polar blowing agents, i.e. all fluorinated blowing gases which are commercially available at a favorable price and also dimethyl ether, have the disadvantage that after foaming they can slowly diffuse through the as yet uncured foam lamellae. This diffusion of a polar blowing agent through the foam lamellae composed of likewise polar material proceeds significantly more quickly than the diffusion of nonpolar air occurring in the opposite direction. This can lead to shrinkage of the foam and may even lead to crack formation, since, unlike in the case of conventional PU foams, no carbon dioxide is liberated during curing and is able to compensate the blowing agent shrinkage. The shrinkage and the associated crack formation make the use of such foams in joins having an unfavorable geometry impossible.

SUMMARY OF THE INVENTION

It is therefore an object of the present invention to provide isocyanate-free prepolymer mixtures which are suitable for producing spray foams and can be foamed using hydrocarbons as blowing agents. This and other objects are surprisingly achieved through the use of prepolymers in which a substantial portion of end groups of the prepolymer are non-polar groups, preferably non-polar hydrocarbon groups.

Through the presence of these groups, greater compatibility with the blowing agent is obtained.

DETAILED DESCRIPTION OF THE PREFERRED EMBODIMENT(S)

Figure 1:
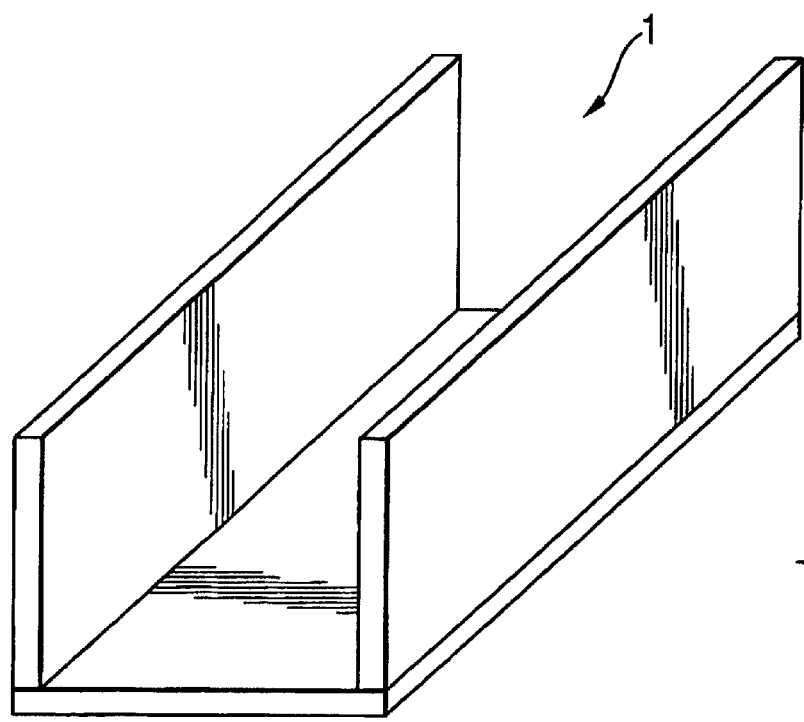
FIG. 1 depicts a model join 1 which can be made of wood or cardboard and has a width and depth of 5 cm in each case.

The invention provides isocyanate-free foamable mixtures comprising (A) a mixture of prepolymers (A) in which 50-99% of the chain ends are terminated by alkoxysilyl groups and 1-50% of the chain ends are terminated by groups of the general formula [2]

$$A^1\text{-}R^1 \quad [2]$$

where $A^1$ is an oxygen atom, an N—$R^2$ group or a sulfur atom, $R^1$ is an alkyl, cycloalkyl, alkenyl, aryl or arylalkyl radical having 2-50 carbon atoms in which the carbon chain can be interrupted as desired by nonadjacent oxygen atoms, sulfur atoms or N—$R^2$ groups and the main chain of $R^1$ can also be substituted by lateral alkyl groups having 1-10 carbon atoms or halogen atoms, and $R^2$ is a hydrogen atom or an alkyl, alkenyl or aryl radical having 1-10 carbon atoms, and (B) a hydrocarbon blowing agent.

The compatibility of alkoxysilane-terminated prepolymers as described in WO 00/04069, WO 02/068491 or WO 02/066532 with hydrocarbon-containing blowing agents can be drastically improved when part of the chain ends of these prepolymers are terminated by nonpolar hydrocarbon chains of the general formula [2]. This effect, which can be achieved even by means of a relatively low content of these alkyl chain end groups, is extremely remarkable and could not have been foreseen, at least to its full extent. Thus, alkoxysilane-terminated prepolymers which in the absence of additional alkyl end groups are virtually completely incompatible with blowing agents comprising pure hydrocarbons such as propane/butane can be altered by incorporation of <10 parts by weight of alkyl end groups to such an extent that they dissolve >20% by volume of pure propane/butane. The resulting mixtures can be foamed without problems. Astonishingly, the hardness of the resulting foams is reduced only slightly by this modification of the prepolymers.

Hydrocarbon blowing agents (B) display no diffusion or only very slow diffusion through the polar foam material. They also display no destabilizing action on the uncured spray foam, and they are also completely ecologically acceptable.

The radical $R^1$ is preferably an alkyl or alkenyl group having 8-26 carbon atoms. It is particularly preferably an alkyl group having 10-18 carbon atoms. The radical $R^1$ can be branched, but is preferably unbranched. The individual radicals $R^1$ can be either identical or different.

The heteroatom $A^1$ is preferably an oxygen atom. This oxygen atom is particularly preferably part of a urethane unit.

Preference is given to isocyanate-free foamable mixtures comprising prepolymers (A) which have alkoxysilyl groups of the general formula [3]

$$[3]$$

where $A^2$ is an oxygen atom, an N—$R^5$ group or a sulfur atom, $R^3$ is an alkyl, cycloalkyl, alkenyl or aryl radical having 1-10 carbon atoms, $R^4$ is an alkyl radical having 1-2 carbon atoms or an ω-oxaalkylalkyl radical having a total of 2-10 carbon atoms, $R^5$ is a hydrogen atom, an alkyl, alkenyl or aryl radical having 1-10 carbon atoms or a —$CH_2$—$SiR^3_z(OR^4)_{3-z}$ group and, z is 0, 1 or 2.

Particular preference is given to alkoxysilyl groups of the general formula [3] in which the heteroatom $A^2$ is part of a urea or urethane unit.

Preferred radicals $R^3$ are methyl, ethyl or phenyl groups. The radicals $R^4$ are preferably methyl groups and preferred radicals $R^5$ are hydrogen, alkyl radicals having 1-4 carbon atoms, cyclohexyl and phenyl radicals.

Particular preference is given to isocyanate-free foamable mixtures comprising prepolymers (A) which have alkoxysilyl groups of the general formula [4]

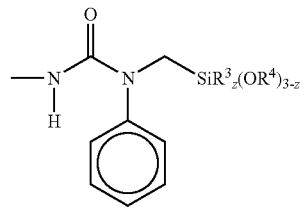

$$[4]$$

where $R^3$, $R^4$ and z are as defined in the case of the formula [3].

In the prepolymers (A) having chain ends of the general formula [3] or [4], the condensable alkoxysilyl groups are separated from a heteroatom only by a methyl spacer. As described, such prepolymers are astonishingly reactive toward water and thus have extremely short tack-free times in the presence of atmospheric moisture and can even be crosslinked in the absence of tin.

Preference is given to 65-95%, in particular 80-95%, of the chain ends of the prepolymer mixtures (A) being terminated by alkoxysilyl groups and 5-35%, in particular 5-20%, of the chain ends being terminated by groups of the general formula [2].

The hydrocarbon blowing agent (B) preferably comprises hydrocarbons having 1-5 carbon atoms, particularly preferably 3-5 carbon atoms. In particular, the hydrocarbon blowing agent (B) is a propane/butane mixture.

In addition to the hydrocarbon blowing agent (B), it is possible to use all blowing agents known for spray foam applications and mixtures thereof. However, the resulting blowing agent mixture (BM) composed of the hydrocarbon blowing agent (B) and one or more further blowing agents preferably contains at least 50% by volume of hydrocarbon blowing agent (B), in particular 80% by volume of hydrocarbon blowing agent (B). As further typical blowing agent component, the blowing agent mixture (BM) contains dimethyl ether, preferably in an amount of 0.1-20%, particularly preferably 1-10%. However, all further known blowing agents can also be present in the blowing agent mixture (BM). Here, it is in principle also possible to use all fluorinated blowing agents such as 1,1,1,2-tetrafluoroethane, 1,1-difluoroethane, 1,1,1,2,3,3,3-heptafluoropropane.

Particular preference is given to blowing agent mixtures (BM) which consist exclusively of hydrocarbon blowing agent (B), preferably propane/butane mixtures, and dimethyl ether. The dimethyl ether content is in this case preferably 0-20% by volume, particularly preferably 1-15% by volume.

The main chains of the prepolymers (A) can be branched or unbranched. The mean chain lengths can be matched as desired to the properties desired in each case, e.g. viscosity of the uncrosslinked mixture and hardness of the finished foam. The main chains can be organopolysiloxanes, e.g. dimethylorganopolysiloxanes, organosiloxane-polyurethane copolymers or organic chains, e.g. polyalkanes, polyethers, polyesters, polycarbonates, polyurethanes, polyureas, vinyl acetate polymers or copolymers. Of course, any mixtures or combinations of prepolymers having different main chains can also be used. The use of organopolysiloxanes or organosiloxane-polyurethane copolymers, if desired in combination with further prepolymers having an organic main chain, has the advantage that the resulting foams have a more favorable burning behavior.

In a particularly preferred embodiment of the invention, the prepolymers (A) have a polyurethane nucleus. The preparation of these prepolymers (A) having a polyurethane nucleus preferably starts out from the following starting materials:
  polyols (A1)
  diisocyanates polisocyantes (A2)
  monomeric alcohols having one OH function (A3)
  alkoxysilanes (A4) which have either an isocyanate function or an isocyanate-reactive group.

As polyols (A1) for preparing the prepolymers (A) having a polyurethane nucleus, it is in principle possible to use all polymeric, oligomeric or monomeric alcohols having two or more OH functions and also mixtures thereof. Particularly suitable polyols (A1) are aromatic and/or aliphatic polyester polyols and polyether polyols as are widely described in the literature. The polyethers and/or polyesters used can be either linear or branched. In addition, they can also have substituents such as halogen atoms. Hydroxyalkyl-functional phosphoric esters/poly-phosphoric esters can also be used as polyols (A1). The use of any mixtures of the various types of polyol is likewise possible.

Examples of useful diisocyanates (A2) are diisocyanatodiphenylmethane (MDI), both in the form of crude or technical-grade MDI and in the form of pure 4,4' or 2,4' isomers or mixtures thereof, tolylene diisocyanate (TDI) in the form of its various regioisomers, diisocyanatonaphthalene (NDI), isophorone diisocyanate (IPDI) and hexamethylene diisocyanate (HDI). Examples of polyisocyanates (A2) are polymeric MDI (P-MDI), triphenylmethane triisocyanate and biuret triisocyanates. The diisocyanates and/or polyisocyanates (A2) can be used individually or as mixtures.

The monomeric alcohols having one hydroxy function (A3) serve to incorporate the chain ends corresponding to the general formula [2] into the prepolymers (A). Here, it is in principle possible to use all alkyl, cycloalkyl, alkenyl, aryl or arylalkyl monoalcohols having 2-50 carbon atoms in which the carbon chains of the alcohols can be interrupted as desired by nonadjacent oxygen atoms, sulfur atoms or N—$R^2$ groups and the main chain can also be substituted by lateral alkyl groups having 1-10 carbon atoms or halogen atoms. However, preference is given to using alkyl or alkenyl alcohols having 8-26 carbon atoms, particularly preferably alkyl alcohols having 10-18 carbon atoms. The carbon chains of these alcohols can be linear or branched, but are preferably unbranched. It is possible to use pure alcohols or mixtures of various alcohols.

As alkoxysilanes (A4) for the preparation of the prepolymers (A) having a polyurethane nucleus, it is in principle possible to use all alkoxysilanes which have either an isocyanate function or an isocyanate-reactive group. The alkoxysilanes serve to incorporate the alkoxysilyl end groups into the prepolymers (A). As alkoxysilanes, preference is given to using compounds which are selected from among silanes of the general formulae [5] and [6]

where
  B is an OH, SH or NHR group and
  $R^3$, $R^4$ and z are as defined in the case of the general formula [3].

It is possible to use individual silanes (A4) or mixtures of various silanes (A4).

Particular preference is given to using silanes (A4) of the general formula [7],

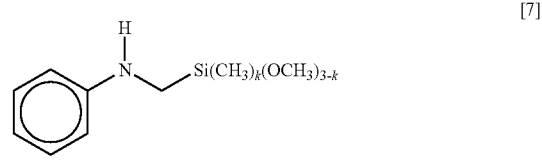

where
  k is 0, 1 or 2.

This silane can be prepared without problems in only one reaction step by reaction of chloromethyltrimethoxysilane or chloromethyldimethoxymethylsilane with aniline, i.e. from very simple and inexpensive starting materials. When this silane is used, prepolymers (A) having alkoxysilyl end groups of the general formula [4] are obtained.

The prepolymers (A) can be prepared by simply combining the components described, if appropriate gradually, with a catalyst being able to be added and/or elevated temperature being able to be employed if appropriate. The isocyanate groups of the diisocyanates and/or polyisocyanates and, if present, the isocyanate groups of the silane of the general formula [5] in this way react with the OH or NH functions of the polyols added and the monomeric alcohols and, if present, with the OH or NH functions of the silanes of the general formulae [6] and/or [7].

The concentrations of all isocyanate groups participating in all reaction steps and all isocyanate-reactive groups and also the reaction conditions are selected so that all isocyanate groups react completely during the prepolymer synthesis. The finished prepolymer (A) is thus isocyanate-free. In a preferred embodiment of the invention, the concentration ratios and the reaction conditions are selected so that virtually all chain ends (>90% of the chain ends, particularly preferably >95% of the chain ends) of the prepolymers (A) are terminated either by alkoxysilyl groups or by radicals of the general formula [2].

The prepolymers (A) having a polyurethane nucleus can be prepared in various ways. In principle, it is possible to place all components together in a reaction vessel and subsequently to start the reaction by addition of a catalyst or by heating. However, owing to the relatively large quantity of heat liberated in these reactions, it is usually advantageous to add the individual components gradually so as to be able to control the quantity of heat liberated more easily. The order and rate of addition of the individual components can be as desired. It is also possible to initially charge or add the various raw materials either individually or as mixtures. A continuous preparation of the prepolymers, e.g. in a tube reactor, is also conceivable in principle.

In a particularly preferred process for preparing the prepolymers, the isocyanate component (A2) comprising one or more different diisocyanates/polyisocyanates is placed in a reaction vessel and admixed with a deficiency of a polyol (A1) or a mixture of a plurality of polyols (A1). These two components react at temperatures above 60-80° C. or in the presence of a catalyst to form an isocyanate-terminated prepolymer. This is subsequently admixed with one or more aminosilanes of the general formulae [6] and/or [7], with the concentrations being selected so that all isocyanate groups react completely. This results in a silane-terminated prepolymer. Purification or other work-up is not necessary.

In a preferred process for preparing the foamable mixtures of the invention, the prepolymer (A) is entirely or at least partly prepared in a pressure vessel. In this case, the blowing agent and all further additives can also be added to the reaction mixture. In this way, the sometimes relatively highly viscous prepolymers (A) are produced in the presence of the blowing agent and a low-viscosity blowing agent/prepolymer solution or mixture is formed directly.

The reaction between isocyanate groups and isocyanate-reactive groups which occurs in the preparation of the prepolymers (A) can, if appropriate, be accelerated by means of a catalyst. Preference is in this case given to using the same catalysts which are described below as curing catalysts (D) for the in-situ foams. If appropriate, the same catalyst or the same combination of a plurality of catalysts which catalyzes the preparation of the prepolymer can also be used as curing catalyst (D) for foam curing. In this case, the curing catalyst (D) is already present in the finished prepolymer and does not have to be added in the compounding of the foamable mixture.

In addition to the prepolymers (A) and the blowing agent (B), the mixtures of the invention can further comprise any further (pre)polymers. These can likewise have reactive groups via which they are incorporated into the network being formed during curing of the foam. However, they can also be unreactive.

In addition to the prepolymers (A) and the hydrocarbon blowing agent (B), the isocyanate-free, foamable mixtures of the invention can further comprise a low molecular weight reactive diluent (C). In this case, up to 100 parts by weight, preferably from 1 to 40 parts by weight, of a low molecular weight reactive diluent (C) which has a viscosity of not more than 5 Pas at 20° C. and has at least one $C_1$-$C_6$-alkoxysilyl group per molecule can be present in the mixture per 100 parts by weight of prepolymer (A).

Suitable reactive diluents (C) are in principle all low molecular weight compounds which have a viscosity of preferably not more than 5 Pas, in particular not more than 2 Pas, at 20° C. and have reactive alkoxysilyl groups via which they can be incorporated into the three-dimensional network being formed during curing of the foam. The reactive diluent (C) serves, in particular, to reduce the viscosity of any relatively high-viscosity prepolymer mixtures. It can be added during the synthesis of the prepolymers (A) and can thus also prevent the occurrence of any intermediates which have a high viscosity and are therefore difficult to handle. The reactive diluent (C) preferably has a sufficiently high density (by weight) of crosslinkable alkoxysilyl groups for it to be able to be incorporated into the network being formed during curing without resulting in a decrease in the network density.

Preferred reactive diluents (C) are the inexpensive alkyltrimethoxysilanes such as methyltrimethoxysilane and also vinyltrimethoxysilane or phenyltrimethoxysilane and their partial hydrolysates. A further preferred reactive diluent is the carbamatosilane of the general formula [8]:

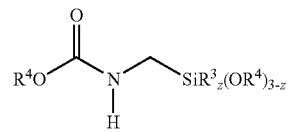

[8]

where $R^3$, $R^4$ and z are as defined in the case of the formula [3].

To achieve rapid curing of the foam at room temperature, a curing catalyst (D) can be added if appropriate. As already mentioned, it is here possible to use, inter alia, the organic tin compounds customarily used for this purpose, e.g. dibutyltin dilaurate, dioctyltin dilaurate, dibutyltin diacetylacetonate, dibutyltin diacetate or dibutyltin dioctoate, etc. Furthermore, it is also possible to use titanates, e.g. titanium(IV) isopropoxide, iron(III) compounds, e.g. iron(III) acetylacetonate, or amines, e.g. aminopropyltrimethoxysilane, N-(2-aminoethyl)-aminopropyltrimethoxysilane, triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Acids such as acetic acid, benzoyl chloride, phosphoric acid and its monoesters and diesters and also inorganic Brönsted acids, e.g. hydrochloric acid, are also suitable as catalysts [D].

However, numerous further organic and inorganic heavy metal compounds and organic and inorganic Lewis acids or bases can also be used for this purpose. In addition, the crosslinking rate can also be increased further by means of a combination of various catalysts or of catalysts with various cocatalysts.

The isocyanate-free, foamable mixtures can further comprise customary additives such as foam stabilizers and cell regulators, flame retardants, thixotropes and/or plasticizers. As foam stabilizers, it is possible to use, in particular, the commercial silicone oligomers modified with polyether side chains. Suitable flame retardants are, inter alia, the known phosphorus-containing compounds, especially phosphates and phosphonates, halogenated and halogen-free phosphoric esters and also halogenated polyesters and polyols or chloroparaffins.

The isocyanate-free foamable mixtures can be used directly as one-component isocyanate-free spray foams.

The mixtures are preferably stored in pressure vessels such as pressure cans.

All the symbols used in the formulae above have their meanings independently of one another in each case. In all formulae, the silicon atom is tetravalent.

Unless indicated otherwise, all quantities and percentages in the following examples are by weight, and all pressures are 0.10 MPa (abs.) and all temperatures are 20° C.

EXAMPLE 1

Preparation of N-phenylaminomethylmethyldimethoxysilane: 2095 g (22.5 mol) of aniline are placed in their entirety in a laboratory reactor and subsequently made inert by means of nitrogen. The aniline is heated to a temperature of 115° C. and 1159 g (7.5 mol) of chloromethylmethyldimethoxysilane are added dropwise over a period of 1.5 hours and the mixture is stirred for a further 30 minutes at 125-130° C. After addition of about 150 g of the silane, an increased amount of aniline hydrochloride precipitates as salt, but the suspension remains readily stirrable until completion of the addition.

The excess aniline is removed in a good vacuum (62° C. at 7 mbar). 1400 ml of n-heptane are subsequently added at room temperature and the suspension is stirred at 10° C. for 30 min in order to crystallize all the aniline hydrochloride. This is subsequently filtered off. The solvent n-heptane is removed at 60-70° C. in a partial vacuum. The residue is purified by distillation (89-91° C. at 0.16 mbar).

A yield of 1210 g, i.e. 76.5% of theory, is achieved at a product purity of about 94.5%. The product contains about 3.5% of N,N-bis[methyldimethoxysilylmethyl]-phenylamine as impurity.

EXAMPLE 2

52.0 g (298.5 mmol) of tolylene 2,4-diisocyanate (TDI) are placed in a 250 ml reaction vessel provided with stirring, cooling and heating facilities and heated to about 50° C. A mixture of 60 g (141.2 mmol) of a polypropylene glycol having a mean molar mass of 425 g/mol and 6 g (32.2 mmol) of 1-dodecanol is then added. The temperature of the reaction mixture should not rise to above 80° C. The polypropylene glycol had previously been dewatered by heating at 100° C. for 1 hour in an oil pump vacuum. After the addition is complete, the mixture is stirred at 80° C. for 15 minutes.

The mixture is subsequently cooled to about 50° C. and 10 ml of vinyltrimethoxysilane are added as reactive diluent. 61.1 g (294.1 mmol) of N-phenylaminomethylmethyldimethoxysilane (prepared as described in example 1) are then added dropwise and the mixture is subsequently stirred at 80° C. for 60 minutes. No isocyanate groups can be detected in the resulting prepolymer mixture by IR spectroscopy. A clear, transparent prepolymer mixture which has a viscosity of 8.2 Pas at 50° C. is obtained. It can be poured and processed further without problems.

EXAMPLE 3

50 g of the prepolymer mixture from example 2 are placed in a pressure bottle valve and mixed with 1.5 g of foam stabilizer PC STAB EP 05 (Wacker Chemie GmbH, Germany) and a catalyst mixture composed of 0.5 g of bis(2-dimethylaminoethyl) ether (Jeffcat® ZF20 from Huntsman) and 0.5 g of aminopropyltrimethoxysilane (A1110 from Crompton).

This mixture is subsequently treated with a blowing agent mixture composed of 8 ml of a propane/butane mixture (2:1) and 1.5 ml of dimethyl ether as blowing agent. This gives a clear and very fluid solution composed of blowing agents, additives and prepolymer.

A further 10 ml of propane/butane are added to this solution, but these no longer physically dissolve. An emulsion can be obtained from this mixture without any problems at all by brief shaking, i.e. by means of about 10-15 easy back and forth movements, and this remains stable for at least 1 hour. At room temperature, it takes 2-3 days for the emulsion to demix completely. Even after demixing, the emulsion can at any time be produced again by renewed brief shaking. Even at low temperature (about 7° C.), an emulsion can be produced without problems by brief shaking (about 20 back and forth movements).

Discharge of the emulsified mixture gives a stiff, white foam which is tack-free after about 10 minutes. The time to complete curing is about 6 hours. The cured foam has a high hardness, is not brittle and has a very good pore structure.

Figure 2:
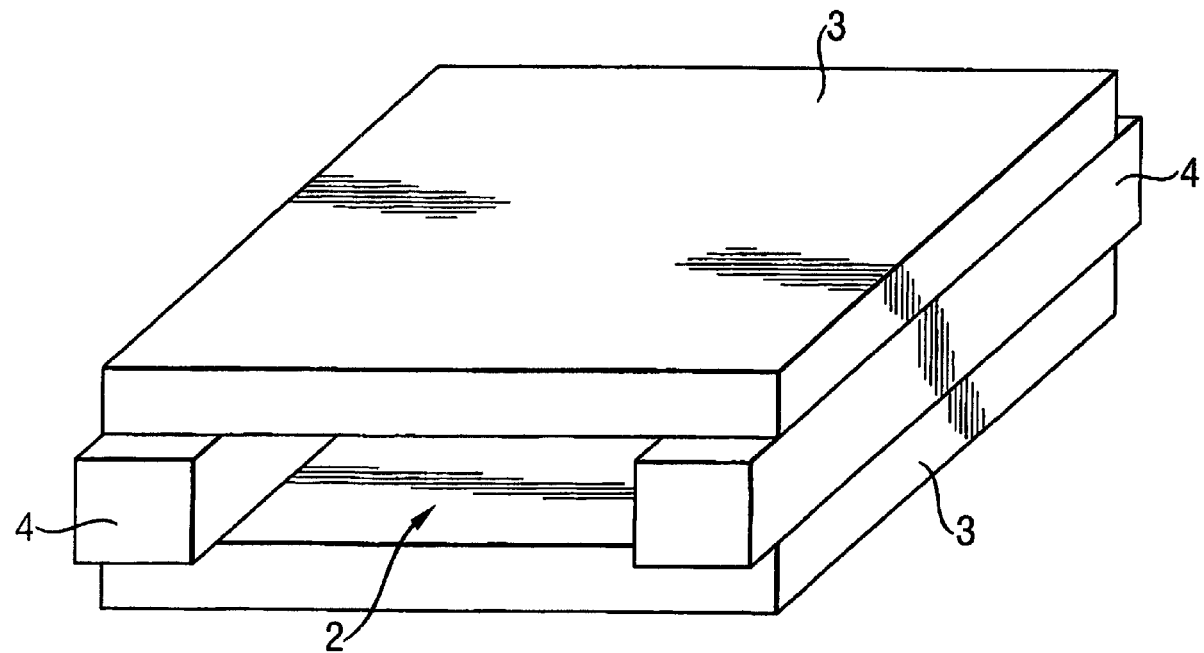
FIG. 2 depicts a model join 2 which consists of 2 wooden boards (3) having the dimensions 1×15×15 cm and 2 plastic beams (4) having dimensions of 2×2×17 cm.

The foam structure is independent of the geometry of the respective join. Both in the case of free foaming, i.e. in the case of foaming on a surface, and in the case of foaming in the model join 1 as shown in FIG. 1 or model join 2 as shown in FIG. 2, crack-free foams are obtained regardless of whether the joins are dry or have been moistened before foaming.

EXAMPLE 4

60.4 g (346.8 mmol) of tolylene 2,4-diisocyanate (TDI) are placed in a 250 ml reaction vessel provided with stirring, cooling and heating facilities and heated to about 50° C. A mixture of 60 g (141.2 mmol) of a polypropylene glycol having a mean molar mass of 425 g/mol and 24 g (128.8 mmol) of 1-dodecanol is then added. The temperature of the reaction mixture should not rise to above 80° C. The polypropylene glycol had previously been dewatered by heating at 100° C. for 1 hour in an oil pump vacuum. After the addition is complete, the mixture is stirred at 80° C. for 15 minutes.

The mixture is subsequently cooled to about 50° C. and 5 ml of vinyltrimethoxysilane are added as reactive diluent. 61.1 g (294.1 mmol) of N-phenylaminomethyl-methyldimethoxysilane (prepared as described in example 1) are then added dropwise and the mixture is subsequently stirred at 80° C. for 60 minutes. No isocyanate groups can be detected in the resulting prepolymer mixture by IR spectroscopy. A clear, transparent prepolymer mixture which has a viscosity of 12.6 Pas at 50° C. is obtained. It can be poured and processed further without problems.

EXAMPLE 5

50 g of the prepolymer mixture from example 4 are placed in a pressure bottle valve and mixed with 1.5 g of foam stabilizer PC STAB EP 05 (Wacker Chemie GmbH, Germany) and a catalyst mixture composed of 0.5 g of bis(2-dimethylaminoethyl) ether (Jeffcat® ZF20 from Huntsman) and 0.5 g of aminopropyltrimethoxysilane (A1110 from Crompton).

This mixture is subsequently treated with a blowing agent mixture composed of 10 ml of a propane/butane mixture (2:1) and 1.0 ml of dimethyl ether as blowing agent. This gives a clear and very fluid solution composed of blowing agents, additives and prepolymer.

A further 8 ml of propane/butane are added to this solution, but these no longer physically dissolve. An emulsion can be obtained from this mixture without any problems at all by brief shaking, i.e. by means of about 10-15 easy back and forth movements, and this remains stable for at least 1 hour. At room temperature, it takes 2-3 days for the emulsion to demix completely. Even after demixing, the emulsion can at any time be produced again by renewed brief shaking. Even at low temperature (about 7° C.), an emulsion can be produced without problems by brief shaking (about 20 back and forth movements).

Discharge of the emulsified mixture gives a stiff, white foam which is tack-free after about 10 minutes. The time to complete curing is about 6 hours. The cured foam has a moderate hardness, has a very good elasticity and has a very good pore structure.

The foam structure is independent of the geometry of the respective join. Both in the case of free foaming, i.e. in the case of foaming on a surface, and in the case of foaming in the model join 1 as shown in FIG. 1 or model join 2 as shown in FIG. 2, crack-free foams are obtained regardless of whether the joins are dry or have been moistened before foaming.

EXAMPLE 6

55.5 g (311.4 mmol) of tolylene 2,4-diisocyanate (TDI) are placed in a 250 ml reaction vessel provided with stirring, cooling and heating facilities and heated to about 50° C. A mixture of 60 g (141.2 mmol) of a polypropylene glycol having a mean molar mass of 425 g/mol and 10 g (41.3 mmol) of 1-cetyl alcohol (linear alcohol having 16 carbon atoms) is then added. The temperature of the reaction mixture should not rise to above 80° C. The polypropylene glycol had previously been dewatered by heating at 100° C. for 1 hour in an oil pump vacuum. After the addition is complete, the mixture is stirred at 80° C. for 15 minutes.

The mixture is subsequently cooled to about 50° C. and 10 ml of vinyltrimethoxysilane are added as reactive diluent. 61.1 g (294.1 mmol) of N-phenylaminomethyl-methyldimethoxysilane (prepared as described in example 1) are then added dropwise and the mixture is subsequently stirred at 80° C. for 60 minutes. No isocyanate groups can be detected in the resulting prepolymer mixture by IR spectroscopy. A clear, transparent prepolymer mixture which has a viscosity of 10.6 Pas at 50° C. is obtained. It can be poured and processed further without problems.

EXAMPLE 7

50 g of the prepolymer mixture from example 6 are foamed in the same way as described in example 5. The foam has the same positive properties as the foam described in example 6 both in the case of free foaming and in the case of foaming in the model join 1 as shown in FIG. 1 or model join 2 as shown in FIG. 2.

EXAMPLE 8

The procedure of example 2 is repeated, but methylcarbamatomethyltrimethoxysilane is added to the foamable mixture as reactive diluent instead of the vinyltrimethoxysilane (likewise 10 ml for a batch corresponding to example 3).

The foaming experiments corresponding to example 3 give a foam which displays a somewhat shorter skin formation time of about 8 minutes. Foam hardness and foam structure are again excellent. Here too, the foam structure is independent of the geometry of the respective join. Crack-free foams are obtained both in the case of free foaming and in the case of foaming in the model join 1 as shown in FIG. 1 or model join 2 as shown in FIG. 2.

COMPARATIVE EXAMPLE 1

24.6 g (141.2 mmol) of tolylene 2,4-diisocyanate (TDI) are placed in a 250 ml reaction vessel provided with stirring, cooling and heating facilities and heated to about 50° C. 30 g (70.6 mmol) of a polypropylene glycol having a mean molar mass of 425 g/mol are then added. The temperature of the reaction mixture should not rise to above 80° C. The polypropylene glycol had previously been dewatered by heating at 100° C. for 1 hour in an oil pump vacuum. After the addition is complete, the mixture is stirred at 80° C. for 15 minutes.

The mixture is subsequently cooled to about 50° C. and 5 ml of vinyltrimethoxysilane are added as reactive diluent. 29.8 g (141.2 mmol) of N-phenylaminomethyl methyldimethoxysilane are then added dropwise and the mixture is stirred at 80° C. for 60 minutes. No isocyanate groups can be detected in the resulting prepolymer mixture by IR spectroscopy. A clear, transparent prepolymer mixture which has a viscosity of 18.5 Pas at 50° C. and can be poured and processed further without problems at this temperature is obtained.

COMPARATIVE EXAMPLE 2

The prepolymer mixture corresponding to comparative example 1 is completely incompatible with propane/butane mixtures as blowing agents. If an attempt is made to prepare a foamable mixture by the procedure of example 3, only a two-phase mixture composed of a blowing agent phase and a prepolymer phase which is extremely highly viscous at room temperature is obtained. These two phases can be emulsified only at an elevated temperature of about 40° C. by long and extremely vigorous shaking (shaking time: >30 min). At room temperature, emulsification by shaking is no longer possible.

On standing for >7 days, complete demixing of the emulsion occurs. Reemulsification of the two-phase mixture is then just as difficult as the first emulsification described above.

In addition, the foaming of the mixture even after emulsification is usually extremely problematical, since, despite the above-described and extremely complicated emulsification process, some tough polymer lumps remain in the prepolymer/blowing agent mixture and can easily block the valve during foaming. Readily foamable, uniform foams are therefore obtained only in exceptional cases.

COMPARATIVE EXAMPLE 3

50 g of the prepolymer mixture from comparative example 1 are mixed with 1.2 g of foam stabilizer PC STAB EP 05 (Wacker Chemie GmbH, Germany) and a catalyst mixture composed of 0.5 g of bis(2-dimethylaminoethyl) ether (Jeffcat® ZF20 from Huntsman) and 0.5 g of aminopropyltrimethoxysilane (A1110 from Crompton). This mixture is subsequently introduced into a pressure bottle with valve and treated with 12 ml of 1,1,1,2-tetrafluoroethane (R 134) as blowing agent.

Discharge of this mixture gives a stiff, white foam which becomes tack-free after about 8 minutes. The time to complete curing is about 6 hours. The cured foam has a high hardness. In the case of free foaming, the foam has a good foam structure.

In the model join 1 as shown in FIG. 1, a crack-free foam having a moderate foam structure is often also obtained. However, the system is not robust, so that relatively small to medium-sized cracks can sometimes occur in the foam. The volume of the cracks can be up to 20% of the volume of the join. Even more critical is the model join 2 as shown in FIG. 2. If the foam is foamed in this join, a completely ruptured foam is obtained. Here, the cracks without exception make up far above 50% of the volume of the join.

COMPARATIVE EXAMPLE 4

The procedure of comparative example 1 is repeated, but methylcarbamatomethyltrimethoxysilane is added to the foamable mixture as reactive diluent instead of the vinyltrimethoxysilane (likewise 5 g for a batch corresponding to comparative example 1).

Foaming experiments corresponding to comparative examples 2 and 3 using the respective blowing agents give exactly the same negative results.

The invention claimed is:

1. An isocyanate-free foamable mixture comprising:
   (A) a mixture of prepolymers in which 50-99% of the chain ends are terminated by alkoxysilyl groups and 1-50% of the chain ends are terminated by groups of the formula [2]

$$A^1\text{-}R^1 \qquad [2]$$

where
   $A^1$ is an oxygen atom, an N—$R^2$ group or a sulfur atom wherein when $A^1$ is $NR^2$ or oxygen,
   $A^1$ is part of a urea or urethane group, respectively,
   $R^1$ is an alkyl, cycloalkyl, alkenyl, aryl or arylalkyl radical having 2-50 carbon atoms in which the carbon chain is optionally interrupted by nonadjacent oxygen atoms, sulfur atoms or N—$R^2$ groups, and the carbon chain of $R^1$ is optionally substituted by lateral alkyl groups having 1-10 carbon atoms or halogen atoms, and
   $R^2$ is a hydrogen atom or an alkyl, alkenyl or aryl radical having 1-10 carbon atoms, and
   (B) a hydrocarbon blowing agent.

2. The foamable mixture of claim 1, wherein $A^1$ is oxygen or $NR^2$ and is part of a urethane group.

3. The foamable mixture of claim 1, wherein $A^1$ is $NR^2$ and $A^1$ is part of a urea group.

4. The foamable mixture of claim 1, wherein from 65-95% of the prepolymer chain ends are terminated by alkoxysilyl groups and 5-35% of the prepolymer chain ends are terminated by groups of the formula [2].

5. The foamable mixture of claim 1, wherein from 80-95% of the prepolymer chain ends are terminated by alkoxysilyl groups and 5-20% of the prepolymer chain ends are terminated by groups of the formula [2].

6. The mixture of claim 1, comprising prepolymers which have alkoxysilyl groups of the formula [3]

where
$A^2$ is an oxygen atom, an N—$R^5$ group or a sulfur atom,
$R^3$ is an alkyl, cycloalkyl, alkenyl or aryl radical having 1-10 carbon atoms,
$R^4$ is an alkyl radical having 1-2 carbon atoms or an ω-(oxyalkyl)alkyl radical having a total of 2-10 carbon atoms,
$R^5$ is a hydrogen atom, an alkyl, alkenyl or aryl radical having 1-10 carbon atoms, or a —$CH_2$—$SiR^3_z(OR^4)_{3-z}$ group and,
z is 0, 1 or 2.

7. The mixture of claim 1, wherein the hydrocarbon blowing agent (B) comprises one or more hydrocarbons having 1-5 carbon atoms.

8. The mixture of claim 1, comprising a blowing agent mixture which comprises at least 50% by volume of hydrocarbon blowing agent (B) and one or more further blowing agents.

9. The mixture of claim 8, wherein a further blowing agent is dimethyl ether.

10. A process for preparing a foamable mixture of claim 1, wherein the prepolymer (A) is prepared at least partly in a pressure vessel.

11. A pressure vessel containing a foamable mixture of claim 1.

12. An isocyanate-free foamable mixture comprising:
   (A) a mixture of prepolymers in which 50-99% of the chain ends are terminated by moisture condensable alkoxysilyl groups and 1-50% of the chain ends are terminated by groups of the formula [2]

$$A^1\text{-}R^1 \qquad [2]$$

where
   $A^1$ is an oxygen atom, an N—$R^2$ group or a sulfur atom,
   $R^1$ is an alkyl or alkenyl group having 10-18 carbon atoms and
   $R^2$ is a hydrogen atom or an alkyl, alkenyl or aryl radical having 1-10 carbon atoms, and
   (B) a hydrocarbon blowing agent.

* * * * *